US007886136B2

(12) United States Patent
Yoon

(10) Patent No.: US 7,886,136 B2
(45) Date of Patent: Feb. 8, 2011

(54) COMPUTER SYSTEM, METHOD, AND MEDIUM FOR SWITCHING OPERATING SYSTEM

(75) Inventor: Sung-min Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 668 days.

(21) Appl. No.: 11/131,316

(22) Filed: May 18, 2005

(65) Prior Publication Data

US 2005/0273663 A1 Dec. 8, 2005

(30) Foreign Application Priority Data

May 21, 2004 (KR) ...................... 10-2004-0036400
Jul. 26, 2004 (KR) ...................... 10-2004-0058266

(51) Int. Cl.
*G06F 9/24* (2006.01)

(52) U.S. Cl. ............................... 713/1; 713/100; 714/4; 710/316

(58) Field of Classification Search ..................... 713/1, 713/100; 714/4; 710/316
See application file for complete search history.

(56) References Cited

U.S. PATENT DOCUMENTS 5,522,076 A 5/1996 Dewa et al.
6,327,653 B1 * 12/2001 Lee ............................ 713/100
6,393,560 B1 * 5/2002 Merrill et al. .................. 713/2
6,442,699 B1 * 8/2002 Nakajima ................... 713/320
6,631,469 B1 * 10/2003 Silvester ........................ 713/2
6,654,827 B2 * 11/2003 Zhang et al. .................. 710/62
6,678,712 B1 * 1/2004 McLaren et al. ............ 718/100
6,684,341 B1 * 1/2004 Malcolm et al. ............ 713/320
6,763,458 B1 * 7/2004 Watanabe et al. ........... 713/100
6,931,474 B1 * 8/2005 Ginosar ...................... 710/316
6,996,828 B1 * 2/2006 Kimura et al. .............. 719/319
7,162,629 B2 * 1/2007 Zimmer et al. .............. 713/100
7,367,062 B2 4/2008 Chang
2001/0018717 A1 * 8/2001 Shimotono .................. 709/319
2001/0056509 A1 * 12/2001 Iwata .......................... 710/20
2002/0087225 A1 * 7/2002 Howard ....................... 700/94
2002/0162444 A1 * 11/2002 Yu et al. ....................... 84/601
2003/0187775 A1 * 10/2003 Du et al. ....................... 705/37

(Continued)

FOREIGN PATENT DOCUMENTS

CN 1392490 A 1/2003

(Continued)

OTHER PUBLICATIONS

*Advanced Configuration and Power Interface Specification*, Intel, Microsoft, Toshiba, Revision 1.0b, Feb. 2, 1999, pp. 1-397.

(Continued)

*Primary Examiner*—Vincent T Tran
(74) *Attorney, Agent, or Firm*—Staas & Halsey LLP

(57) ABSTRACT

An operating system switching method in a computer system having at least two operating systems is provided. The operating system switching method may include receiving a command of switching a first operating system that is currently running to a second operating system, causing the computer system to make a transition to a low-power sleeping state in response to the command, and booting the computer system using the second operating system in the transitioned state.

17 Claims, 12 Drawing Sheets

U.S. PATENT DOCUMENTS

| | | | | |
|---|---|---|---|---|
| 2004/0006690 | A1* | 1/2004 | Du et al. | 713/2 |
| 2004/0107359 | A1* | 6/2004 | Kawano et al. | 713/200 |
| 2004/0205396 | A1* | 10/2004 | Wu et al. | 714/23 |
| 2004/0226020 | A1* | 11/2004 | Birmingham | 719/310 |
| 2005/0204181 | A1* | 9/2005 | Montero et al. | 714/4 |
| 2005/0246561 | A1* | 11/2005 | Wu et al. | 713/300 |
| 2006/0218340 | A1* | 9/2006 | Fujita et al. | 711/103 |
| 2006/0219778 | A1* | 10/2006 | Komatsu | 235/382 |
| 2007/0050603 | A1* | 3/2007 | Vorbach et al. | 712/221 |
| 2009/0086938 | A1* | 4/2009 | Ushida | 379/93.01 |

FOREIGN PATENT DOCUMENTS

| | | |
|---|---|---|
| CN | 1437106 A | 8/2003 |

OTHER PUBLICATIONS

Chinese Patent Office Action dated Apr. 27, 2007, issued in corresponding Chinese Patent Application No. 2005-100710410.

* cited by examiner

COMPUTER SYSTEM, METHOD, AND MEDIUM FOR SWITCHING OPERATING SYSTEM

CROSS-REFERENCE TO RELATED APPLICATIONS

This application claims the benefit of Korean Patent Application Nos. 10-2004-0036400 filed on May 21, 2004 and 10-2004-0058266 filed on Jul. 26, 2004 in the Korean Intellectual Property Office, the disclosures of which are incorporated herein by reference in their entireties.

BACKGROUND OF THE INVENTION

1. Field of the Invention

The present invention relates to a multi operating system, and more particularly, to an operating system switching method in a computer system having a multi operating system mounted thereon.

2. Description of the Related Art

Although a single operating system was installed in one computer system in the past, the development of a computer technology has enabled two or more operating systems to be installed on a computer system. An operating system configuration having two or more operating systems installed therein is referred to as a multi operating system.

Thus, a user has become able to perform a desired computing task in an appropriate operating system once a desired multi operating system configuration is constructed. During a computing task, if it is required that a different computing task be performed, a computer system must be switched from one operating system to another operating system. Thus, the computer system having a multi operating system typically provides an operating system switching function.

FIG. 1 is a flowchart illustrating a conventional operating system switching method. For the sake of convenient explanation, an operating system switching method in a computer system having Windows® and Linux® operating systems installed therein is illustrated in FIG. 1.

In step S100, it is assumed that the Windows® operating system is booted and is operating normally. In this case, in steps S110 and S120, when a user wants to switch the Windows® operating system to the Linux® operating system using a predetermined short key, the Windows® operating system switches a power management state of the computer system to a soft off state S5, which is described in more detail with respect to FIG. 2. In other words, the computer system uses a power management function so as to switch the operating system.

When switching a conventional operating system, a power management state is turned to a power management state corresponding to the S5 state 240 (FIG. 2) in step S120, so that the Windows® operating system is terminated. When power is turned on in step S130, bios booting starts in step S140. In this case, the power may be turned on through a user's power inputting button or automatically by the computer system. While the bios booting is performed, the user is asked which operating system the computer system is to be booted by in step S150. The user selects the Linux® operating system and then the computer system is booted by the Linux® operation system in step S160. Here, of course, if the user selects the Windows® operating system, the computer system will be booted by the Windows® operating system S100.

For a better understanding of a conventional operating system switching method, a power management function of the computer system will now be described briefly.

The power management system of the computer system has been advanced from an initially simple function to an enhanced function. Recently, advanced configurations and power interface (ACPI) specification have been proposed by Intel Corporation, Microsoft Corporation, and Toshiba Corporation. According to the ACPI specification, power management is not performed by BIOS (Basic Input/Output System) but is performed by an operating system. The detailed contents of the ACPI specifications are disclosed in "Advanced Configuration and Power Interface Specification Revision 1.0."

FIG. 2 is a state diagram illustrating various states of a computer system according to the ACPI specification and transition of each state.

As shown in FIG. 2, the overall states of the computer system are five; a legacy state 210, a G0 state 220, a G1 state 230, a G2 state 240, and a G3 state 250.

In the legacy state 210, an ACPI function is disabled and power management is not performed. In the G0 state 220, the computer system normally works. In the G1 state 230, that is, a sleeping state, power consumption is gradually reduced. In the G2 state 240, that is, a soft off state, only a minimum of power is consumed to sense soft switching (switching of the computer system for power on/off). In the G3 state 250, that is, a mechanical off state, power supply is cut off.

In the state where the ACPI function is enabled and power is supplied, the computer system has six-stage sleeping states S0 to S5. An S0 state corresponds to the G0 state 220, states S1 to S4 232, 234, 236, and 238 (hereinafter, referred to as low-power sleeping states) correspond to the G1 state 230. An S5 state corresponds to the G2 state 240. In the low-power sleeping states 232, 234, 236, and 238, power consumption is gradually reduced according to an operating state of the computer system. In this state, the S1 state 232 is a low-power sleeping state in which all states of the computer system are stored, and the S2 state 234 is a low-power sleeping state similar to the S1 state 232 but a CPU cache and a system cache are not stored in the S2 state 234. The S3 state 236 is a low-power sleeping state similar to the S1 state 232 but information on hardware except for memory information is lost. In the S4 state 238, that is, a low-power sleeping state, the hardware stops operating. In the S4 state 238, power is almost cut off, and thus, it takes time to reuse the S4 state 238. However, the environment of the previously operated operating system, such as memory information, information on a variety of applications, or data information, is stored in a hard disc, which is referred to as image backup.

As shown in FIGS. 1 and 2, in the conventional operating system switching method, after the current operating system is completely terminated, bios booting is performed and booting by an operating system to be switched is then performed. When necessary, when or after bios booting, a process of asking the user to select an operating system may be performed.

In other words, in the course of terminating the current operating system, the overall time required for switching the operating system is prolonged and an unnecessary user's operation, such as user's selection of an operating system, is needed. These problems should be solved for a multi operating system that requires faster booting.

In addition, in switching the current operating system to an operating system dedicated to a specific purpose, the other processes or hardware that have not been used for the specific purpose may also be operated, which results in unnecessary consumption of system resource or power. Thus, in order to save system resource and power, what is needed is to operate only the processes or hardware needed for implementing the specific purpose.

SUMMARY OF THE INVENTION

Additional aspects and/or advantages of the invention will be set forth in part in the description which follows and, in part, will be apparent from the description, or may be learned by practice of the invention.

The present invention provides an operating system switching method by which, when switching an operating system in a computer system in which a multi operating system is installed, the state of the computer system is turned to a specific state and the operating system is switched to a desired operating system in the transitioned state so that a time required for switching the operating system is reduced and a user's additional operation is not needed.

The present invention also provides an operating system switching method by which information on the environment of an operating system that has operated previously is stored during operating system switching so that the environment of a previous operating system is maintained even if a current operating system is restored to the operating system that has operated previously.

The present invention also provides an operating system switching method by which a low power state for system optimization is maintained when a current operating system is switched to an operating system installed for a specific purpose.

The above stated objects as well as other objects, features and advantages, of the present invention will become clear to those skilled in the art upon review of the following description, the attached drawings and appended claims.

According to an aspect of the present invention, there is provided an operating system switching method in a computer system having at least two operating systems, the operating system switching method including receiving a command of switching a first operating system that is currently running to a second operating system, causing the computer system to make a transition to a low-power sleeping state in response to the command, and booting the computer system using the second operating system in the transitioned state.

The receiving of the command may include receiving the command using an inputting unit provided in the computer system. The inputting unit may include a user inputting device for switching an operating system, a wireless signal receiving module, and a network interface module.

The low-power sleeping state may include an S3 power management state according to the advance configuration and power interface (ACPI) specification.

The causing of the computer system to make a transition to a low-power sleeping state may include setting power management state information indicating the transitioned low-power sleeping state and operating system switching information indicating booting of the computer system using the second operating system, and the booting of the computer system using the second operating system in the transitioned state may include booting the computer system using the second operating system according to the power management state information and the operating system switching information.

The causing the computer system to make a transition to a low-power sleeping state may include storing information on an environment of the first operating system when receiving the command in a predetermined storage area. The information may include system resource information, program information, or data information. The information may be stored in the predetermined storage area in an S4 power management state according to the ACPI specification.

The booting of the computer system using the second operating system in the transitioned state may include extracting information on the environment of the operating system from the predetermined storage area and providing an environment of the second operating system using the extracted information, the extracted information including information on the environment of the second operating system that operates before switching the second operating system to the first operating system. The information may be stored in the predetermined storage area in an S4 power management state according to the ACPI specification.

According to another aspect of the present invention, there is provided a computer system having at least two operating systems, the computer system including a receiving module receiving a command of switching a first operating system that is currently running to a second operating system, a state controlling module causing the computer system to make a transition to a low-power sleeping state in response to the command, and an operating system switching module booting the computer system using the second operating system in the transitioned state.

The low-power sleeping state may include an S3 power management state according to the advance configuration and power interface (ACPI) specification.

The state controlling module may transmit power management state information indicating the transitioned low-power sleeping state and operating system operating system switching information indicating booting of the computer system using the second operating system to the operating system switching module, and the operating system switching module may boot the computer system using the second operating system according to the power management state information and the operating system switching information.

The operating system switching module performs operating system switching including a bios ROM.

The computer system may further include a storage module storing information on the environment of the second operating system, in which the computer system was being operated before being switched to the first operating system, wherein the operating system switching module extracts the information from the storage module and performs operating system switching using the extracted information for providing the environment of the second operating system. The storage module may store the information in an S4 power management state according to the ACPI specification.

According to still another aspect of the present invention, there is provided an operating system switching method in a computer system having at least two operating systems, the operating system switching method including booting a first operating system that is currently running to a second operating system for providing multimedia contents to a user, controlling at least two hardware states included in the computer system according to types of the multimedia contents, and providing the multimedia contents to the user in the controlled hardware states.

According to yet another aspect of the present invention, there is provided an operating system switching method in a computer system having at least two operating systems, the operating system switching method including booting a first operating system that is currently running to a second operating system for providing multimedia contents to a user, providing a user interface for providing a list of the multimedia contents to the user, causing the computer system to be set to a low-power state mode so as to execute the multimedia contents selected by the user from the list, and executing the selected multimedia contents in the low-power state mode.

According to yet another aspect of the present invention, there is provided at least one computer readable medium storing instructions that control at least one processor to perform a method including receiving a command of switching a first operating system that is currently running in a computer system to a second operating system, causing the computer system to make a transition to a low-power sleeping state in response to the command; and booting the computer system using the second operating system.

According to yet another aspect of the present invention, there is provided at least one computer readable medium storing instructions that control at least one processor to perform a method including booting a first operating system that currently running to a second operating system for providing multimedia contents to a user; controlling at least two hardware states included in the computer system according to types of the multimedia contents; and providing the multimedia contents to the user in the controlled hardware states.

According to yet another aspect of the present invention, there is provided at least one computer readable medium storing instructions that control at least one processor to perform a method including booting a first operating system that is currently running to a second operating system for providing multimedia contents to a user; providing a user interface for providing a list of the multimedia contents to the user; causing the computer system to be set to a low-power state mode so as to execute the multimedia contents selected by the user from the list; and executing the selected multimedia contents in the low-power state mode.

BRIEF DESCRIPTION OF THE DRAWINGS

These and/or other aspects, features, and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
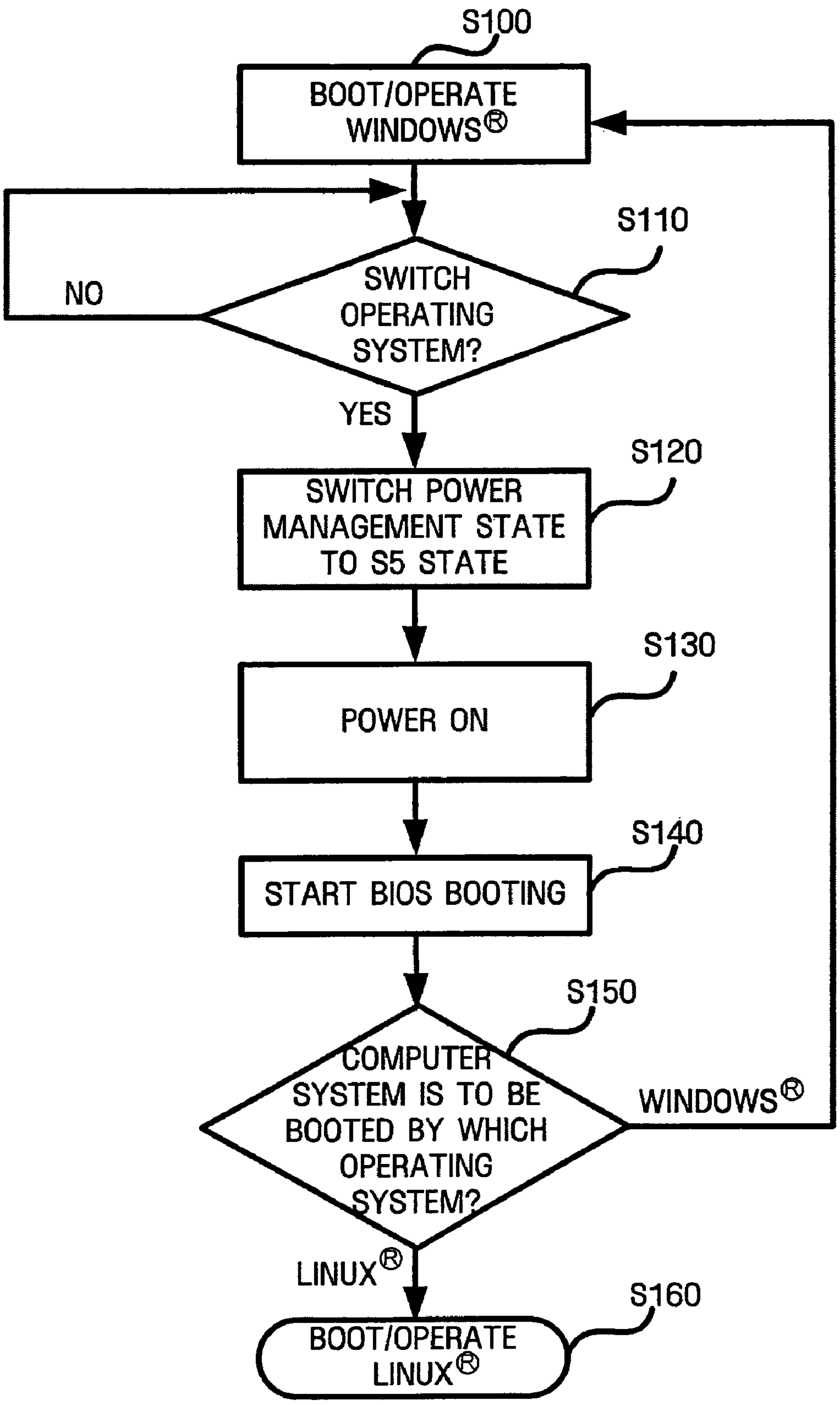
FIG. 1 is a flowchart illustrating a conventional operating system switching method.
Figure 2:
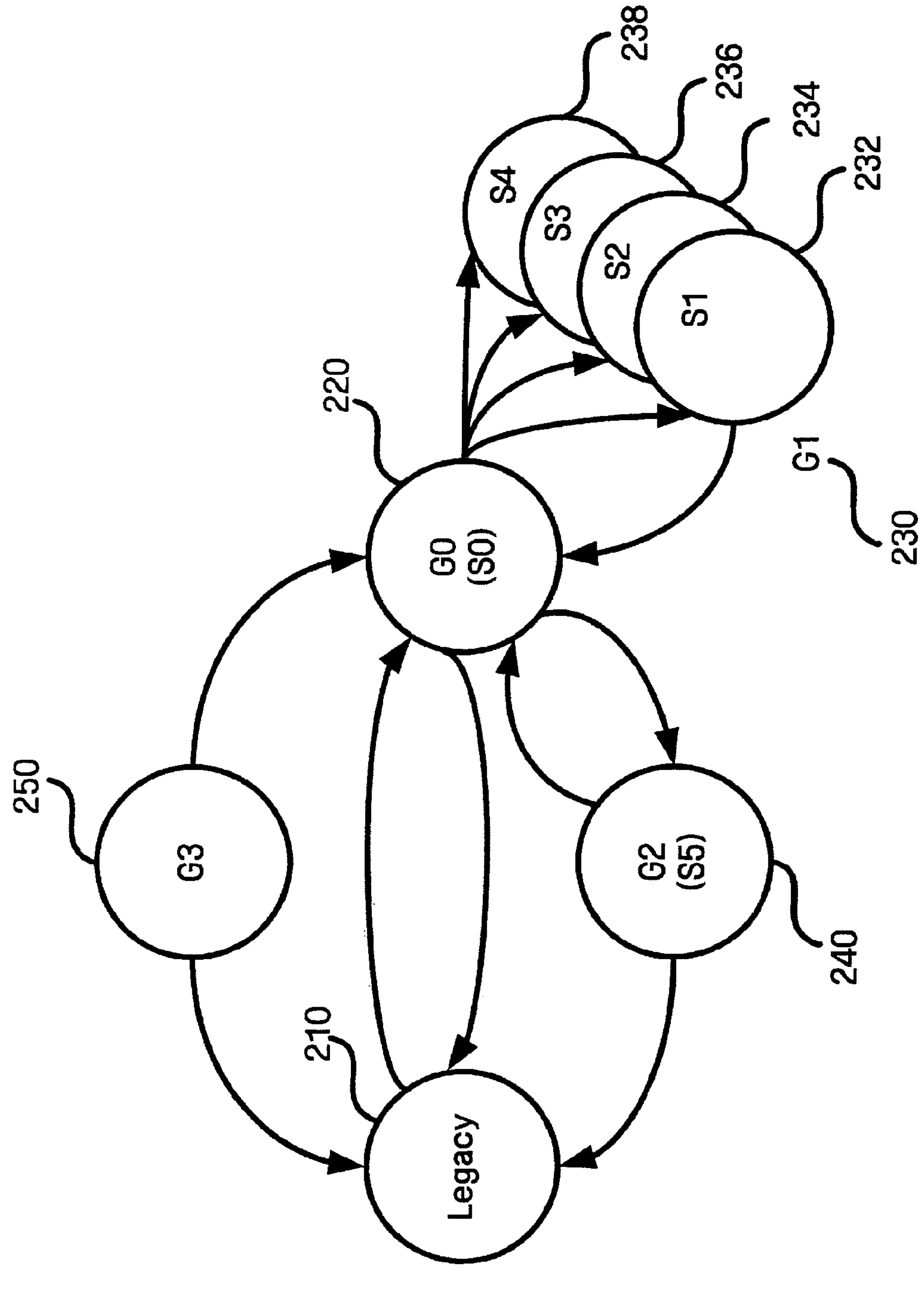
FIG. 2 is a state diagram illustrating the state of a computer system according to the ACPI specification and transition of each state.

Reference will now be made in detail to embodiments of the present invention, examples of which are illustrated in the accompanying drawings, wherein like reference numerals refer to the like elements throughout. Exemplary embodiments are described below to explain the present invention by referring to the figures.

The present invention is described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus to implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture to implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Meanwhile, for a better understanding of the present invention, it is assumed that the Windows® and Linux® operating systems are installed in a computer system according to the present invention. However, the present invention is not limited to Windows® and Linux® and may include other operating systems in addition in Windows® and Linux®, in place of Windows® and/or Linux®, or any combination thereof. In addition, although the examples below indicate that the Windows® operating system is the default operation system, another operating system such as Linux® may be designated as the default operating system.

Figure 3:
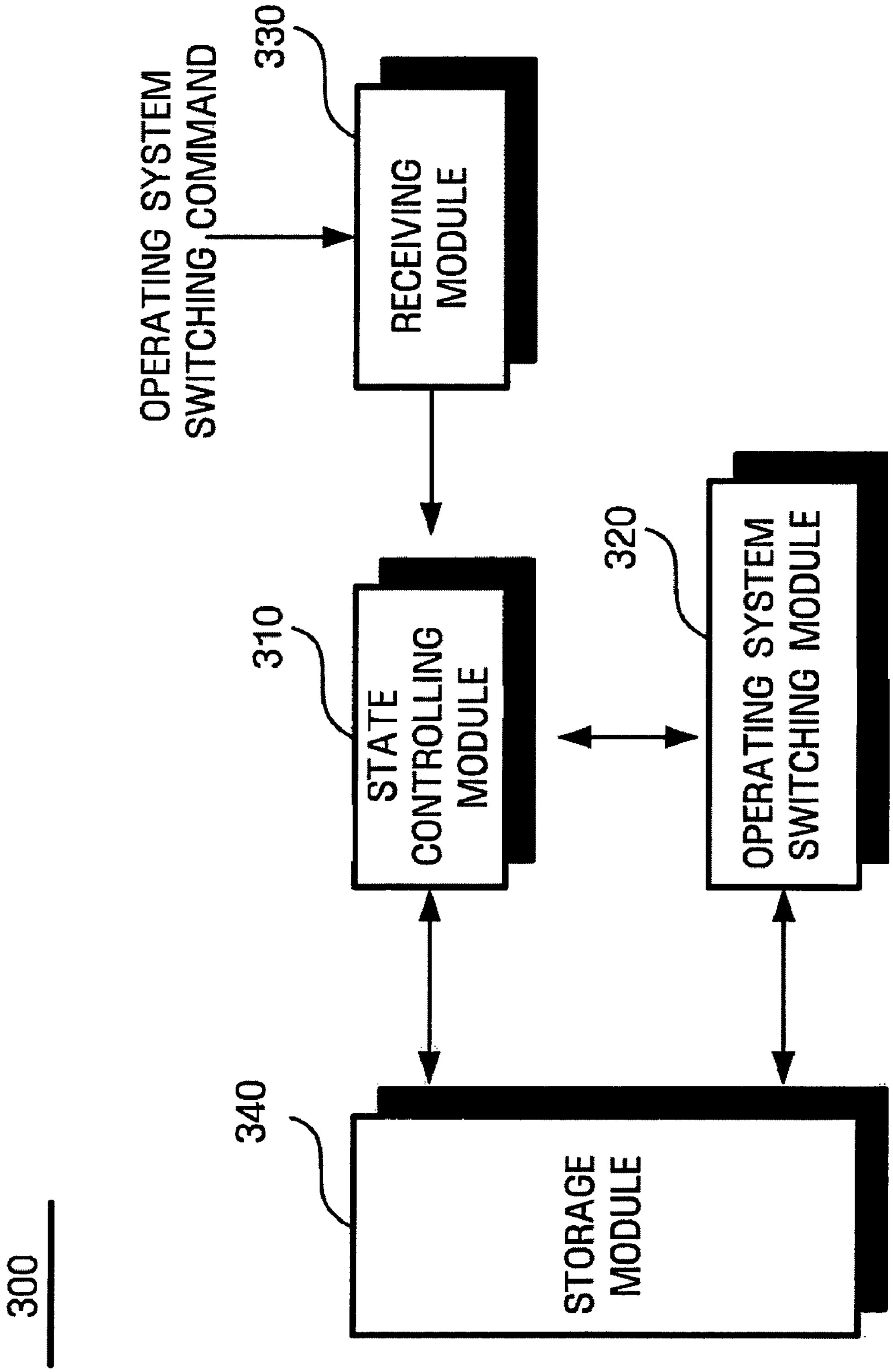
FIG. 3 is a block diagram illustrating a computer system for performing operating system switching according to an exemplary embodiment of the present invention.

FIG. 3 is a block diagram illustrating a computer system 300 for performing operating system switching according to an exemplary embodiment of the present invention. The computer system 300 includes a receiving module 330 which receives an operating system switching command from a user, a state controlling module 310 which controls the state of the computer system 300 in response to the command, an operating system switching module 320 which switches the current operating system to a different operating system in response to the command, and a storage module 340 which stores information on an environment of an operating system that has been previously operated when switching the operating system.

Here, the term 'module', as used herein, generally refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they may be executed on one or more computers in a communication system.

The operation of the modules will now be described in more detail.

If a user who works under the Windows® operating system executes an operating system switching command using a predetermined inputting unit so as to switch the current operating system to the Linux® operating system, the receiving module 330 receives the operating system switching command. In this case, a user inputting device such as a mouse, a keyboard, and a touch screen may be used as the inputting unit. Alternatively, when the user switches the operating system using a remote controller, a wireless signal receiving module for receiving a wireless signal transmitted from the remote controller may be used as the inputting unit. In addition, when the user performs operating system switching via a wired or wireless network, the inputting unit may include a network interface module.

The receiving module 330 processes the operating system switching command received from the inputting unit as 'occurrence of an event' and transmits information on the event to the state controlling module 310. In this case, the state controlling module 310 transmits power management state information that indicates a power management state of the computer system 300 and operating system switching information indicating that booting is performed using the Linux® operating system, to the operating system switching module 320. In one example, the power management state information may indicate a state where power is partially supplied to the computer system 300. In this example, the state where power is partially supplied, may be a state where power is supplied to all system resources of the computer system 300 and all devices installed in the computer system so that the system resources and the devices can operate, or may be a state where power is not supplied to the computer system 300, for example, a 'low-power sleeping state' described previously. The power management information may also indicate a state such as "system terminated."

Meanwhile, the power management state information and the operating system switching information may be transmitted in a message format.

The operating system switching module 320 includes respective variables that indicate the power management state information and the operating system switching information, and sets information received from the state controlling module 310 to the variables. Hereinafter, for a better understanding of the present invention, a variable that indicates the power management state information is referred to as 'Power_state_var', and a variable that indicates the operating system switching information is referred to as 'InstantOn_var'. Since values set to the variables are preferably maintained even though power of the computer system 300 is turned off, the switching module 320 may be implemented with a device that operates by an additional power source, such as a bios ROM, and or a program that operates in the device. The variable 'Power_state_var' may indicate a power management state about each operating system in one variable.

When the variable 'Power_state_var' and the variable 'InstantOn_var' are changed, the operating system switching module 320 turns the power management state of the computer system 300 to a power management state set in the variable 'Power_state_var'. Then, booting starts by using the Linux® operating system set in the variable 'InstantOn_var'. In this case, the power management state may be defined as power management states S1 to S4 according to the (ACPI) specification, that is, the previously-described low-power sleeping state, and preferably, an S3 or S4 state.

When switching to the Linux® operating system, the user may still want to maintain an environment of the Windows® operating system. Then, information on the environment of the Windows® operating system is stored in the storage module 340. In this example, the storage module 340 may be a nonvolatile storage medium such as a hard disc. Information on the environment of the Windows® operating system may be system resource information such as a memory, program information such as applications stacked on the memory or a variety of processes of performing background works, and data information related to the program. In addition, the information may be stored in the storage module 340 by way of being stored in an S4 power management state according to the ACPI specification. In this example, when the user switches the Windows® operating system to the Linux® operating system and switches the Linux® operating system to the Windows® operating system again, the environment of the Windows® operating system can be restored. It is determined by a value set in the variable 'Power_state_var' whether or not the operating system switching module 320 restores information on the environment of the operating system stored in the storage module 340.

For example, when the user wants to switch the Windows® operating system to the Linux® operating system while maintaining the environment of the Windows® operating system, the value set in the variable 'Power_state_var' is set at an 'S4 power management state', and information on the environment of the Windows® operating system is stored in the storage module 340. Then, when restoring to the Windows® operating system, the operating system switching module 320 finds the value set in the variable 'Power_state_var' to be set at the 'S4 power management state', extracts the information that has been previously stored in the storage module 340, and restores the environment of the Windows® operating system.

In this case, when the user executes an operating system switching command, the user may be asked, using an interface such as a graphic user interface (GUI), whether the user stores information on the environment of the current operating system in the storage module 340. Otherwise, codes indicating the operating system switching command may be varied according to an operating system switching method.

For a better understanding of the present invention, a case where information on an environment of an operating system during operating system switching is not stored is referred to as a 'first operating system switching mode', and a case where information on the environment of the operating system during operating system switching is stored is referred to as a 'second operating system switching mode'.

Figure 4:
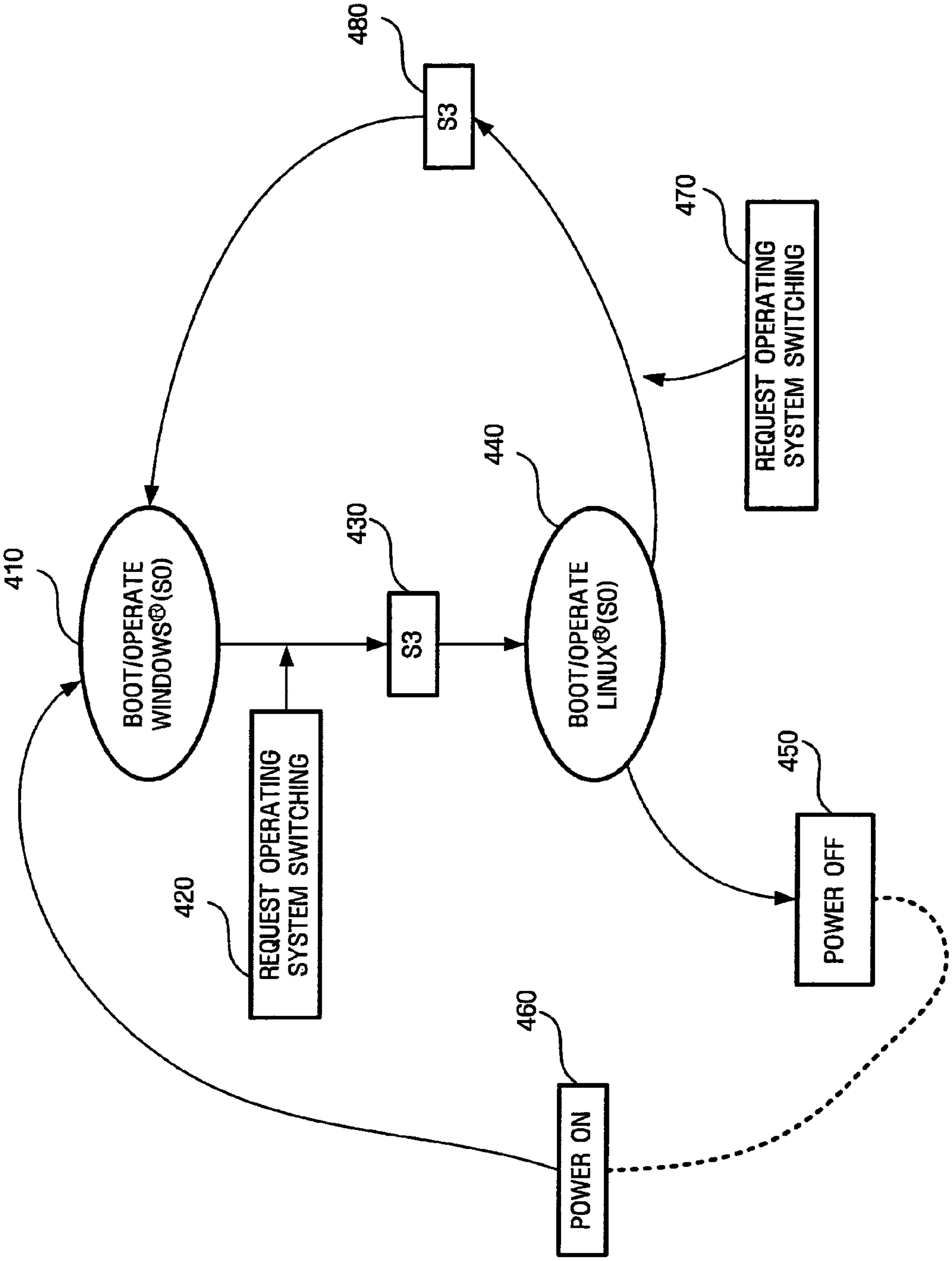
FIG. 4 is a state diagram illustrating operating system switching, that is, a first operating system switching mode, according to an exemplary embodiment of the present invention.

FIG. 4 is a state diagram illustrating operating system switching, that is, a first operating system switching mode, according to an exemplary embodiment of the present invention.

For example, it is assumed that the current Windows® operating system is normally booted and operates in step 410. This state corresponds to an S0 power management state of the ACPI specification. In this example, when an event about operating system switching request from a user occurs in step 420 occurs, the power management state is switched to an S3 power management state of the ACPI specification in step 430. Then, the current Windows® operating system is booted by the Linux® operating system, so that the environment of the Linux® operating system is established in step 440. There may be two cases in the state of step 440: a case where power of a computer system is turned off by the user in step 450; and a case where the Linux® operating system is switched to the Windows® operating system in step 470.

If the user turns off the power of the computer system and turns on the power again in step 460, the computer system is booted by a predetermined operating system. FIG. 4 illustrates that the computer system is booted by the Windows® operating system.

If the user switches the Linux® operating system back to the Windows® operating system in step 470, the power management state is switched to the S3 power management state of the ACPI specification in step 480, and the computer system is booted by the Windows® operating system so that the environment of the Windows® operating system is established in step 410.

Figure 5:
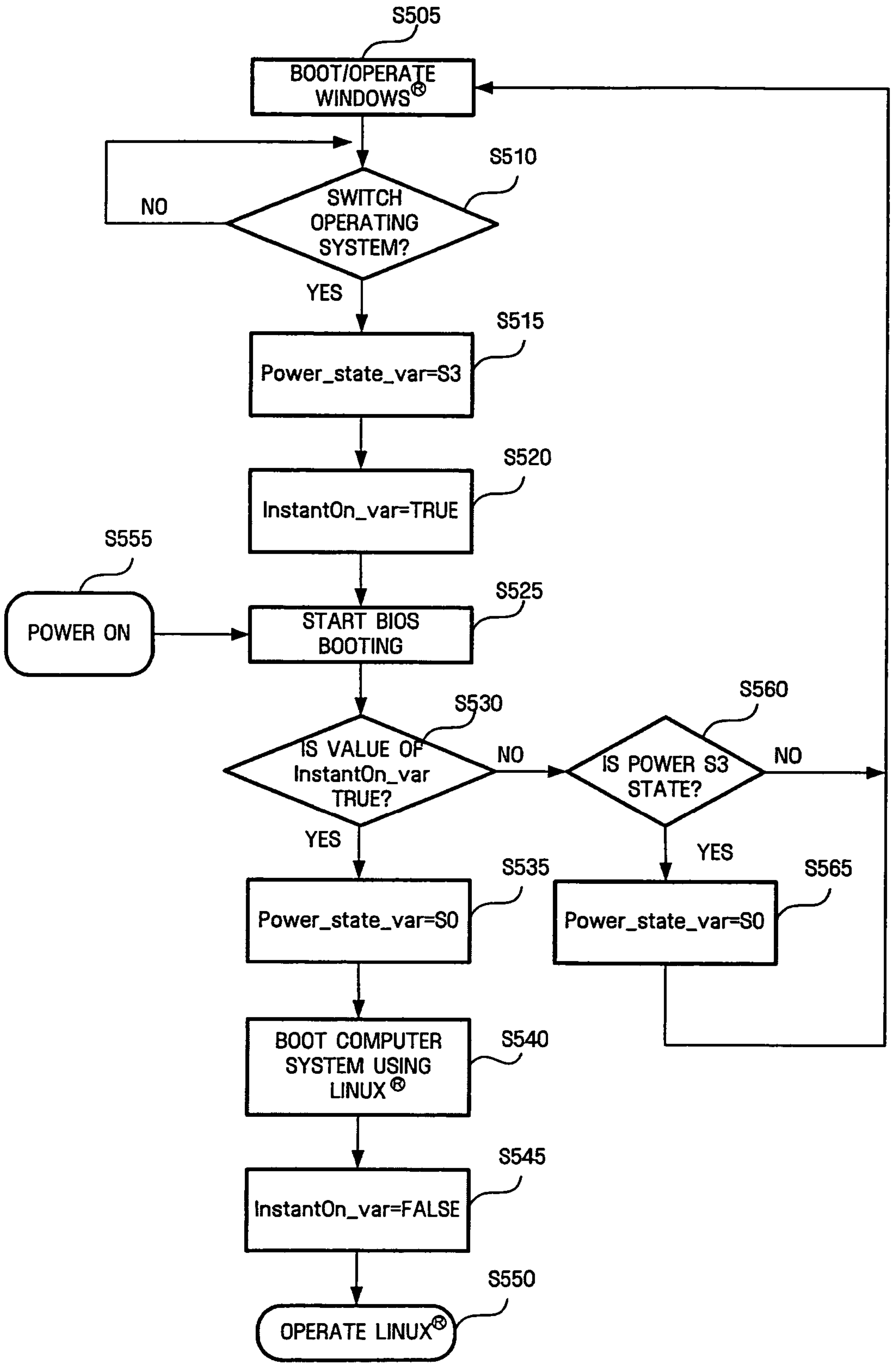
FIG. 5 is a flowchart illustrating an operating system switching method shown in FIG. 4.

FIG. 5 is a flowchart illustrating an operating system switching method shown in FIG. 4.

For example, it is assumed that the current Windows® operating system is normally booted and operates in step S505. In this example, when an event indicating that the user switches the operating system occurs, a value indicating an S3 power management state of the ACPI specification is set in a variable 'Power_state_var' in steps S510 and S515. Then, a variable 'InstantOn_var' is set to 'TRUE' in step S520, and bios booting starts in step S525. Meanwhile, a case where the variable 'InstantOn_var' is set to 'TRUE' indicates that the current operating system is switched to an operating system that has not operated at present, and a case where the variable 'InstantOn_var' is set to 'FALSE' indicates that the current operating system is not switched to the operating system that has not operated at present, that is, that the operating system that is currently running is maintained. Preferably, an initial value of the variable 'InstantOn_var' is set to 'FALSE', and the variable 'Power_state_var' and the variable 'InstantOn_var' is stored in a bios ROM.

When bios booting starts in step S525, if the variable 'InstantOn_var' is set to 'TRUE', the current operating system should be switched to the Linux® operating system. In this case, a value indicating an S0 power management state of the ACPI specification is set to the variable 'Power_state_var' in step S535. Then, the computer system is booted by the Linux® operating system in step S540, and the variable 'InstantOn_var' is set to 'FALSE'. This is because, if the variable 'InstantOn_var' is set to 'TRUE', the operating system should be switched to the Windows® operating system. Then, the Linux® operating system operates in step S550.

Meanwhile, the computer system may operate by pressing a power button of the computer system that is turned off in step S555. In this case, bios booting starts like in a conventional method in step S525. In this case, it is assumed that the booted operating system is initially set to the Windows® operating system. Thus, since the variable 'InstantOn_var' is set to 'FALSE', the current operating system is not switched to the Linux® operating system.

When the variable 'Power_state_var' is set to a value indicating a state which corresponds to the S3 power management state of the ACPI specification in step S560, the variable 'Power_state_var' should be set to a value which corresponds to the S0 power management state of the ACPI specification in step S565. This is because the computer system is prevented from remaining in the S3 power management state of the ACPI specification.

Figure 6:
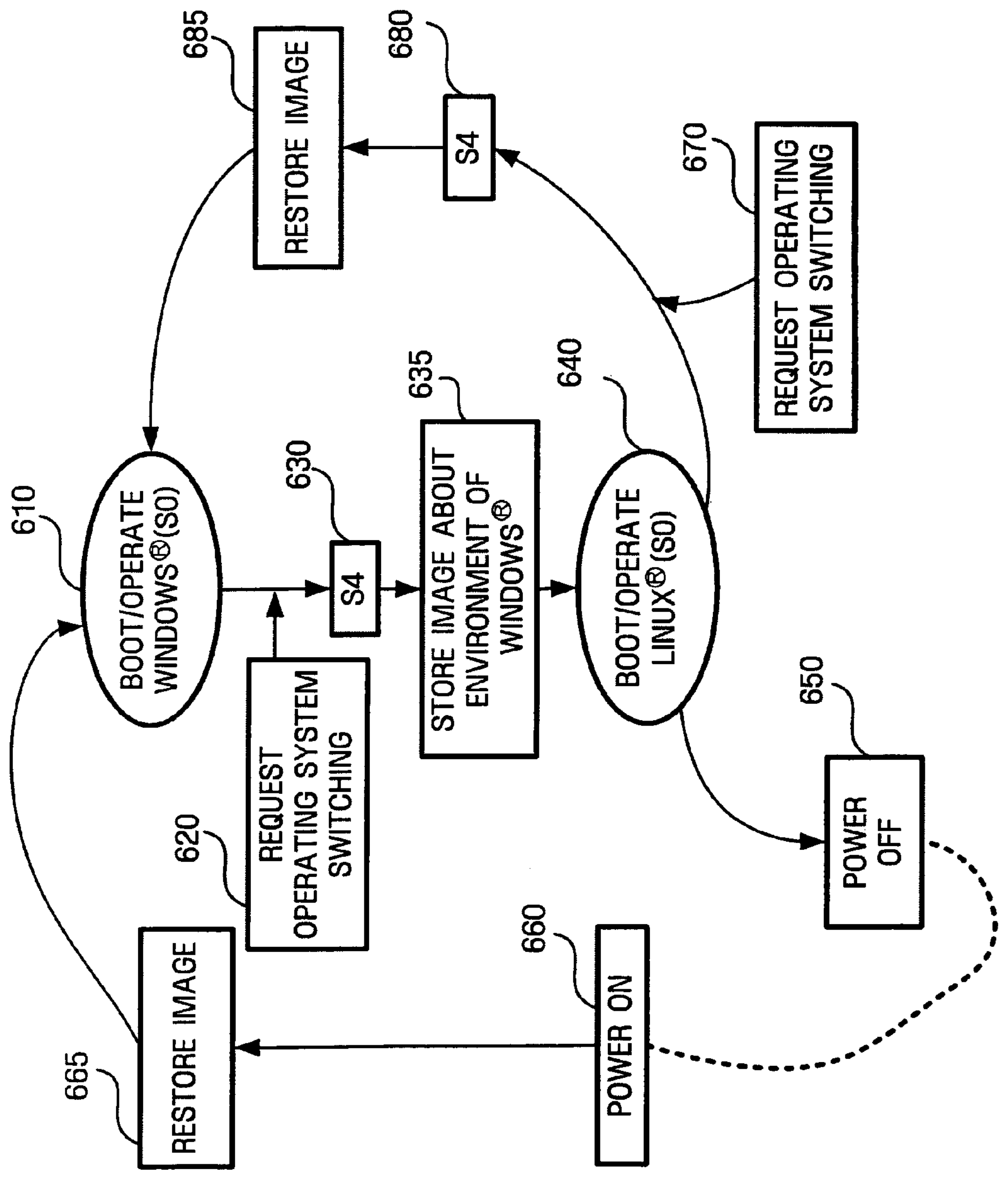
FIG. 6 is a state diagram illustrating operating system switching, that is, a second operating system switching mode, according to another exemplary embodiment of the present invention.

FIG. 6 is a state diagram illustrating operating system switching, that is, a second operating system switching mode, according to another exemplary embodiment of the present invention.

For example, it is assumed that the current Window operating system is normally booted and operates in step 610. This state corresponds to an S0 power management state of the ACPI specification. In this case, when an event about operating system switching request from a user occurs in step 620, the power management state is switched to an S4 power management state of the ACPI specification in step 630. Then, information on an environment of the Windows® operating system is imaged and stored in step 635, and the computer system is booted by the Linux® operating system so that the environment of the Linux® operating system is established in step 640. There may be two cases in the state of step 640: a case where power of a computer system is turned off by the user in step 650; and a case where the Linux® operating system is switched to the Windows® operating system in step 670.

If the user turns off the power of the computer system and turns on the power again in step 660, the computer system is booted by a predetermined operating system.

FIG. 6 illustrates that the computer system is booted by the Windows® operating system. In this case, the image stored in step 635 is restored in step 665.

If the user switches the Linux® operating system back to the Windows® operating system in step 670, the power management state is switched to the S4 power management state of the ACPI specification in step 680, and the computer system is booted by the Windows® operating system so that the environment of the Windows® operating system is established in step 610. Even in this case, the image stored in step 635 is restored in step 685.

Figure 7:
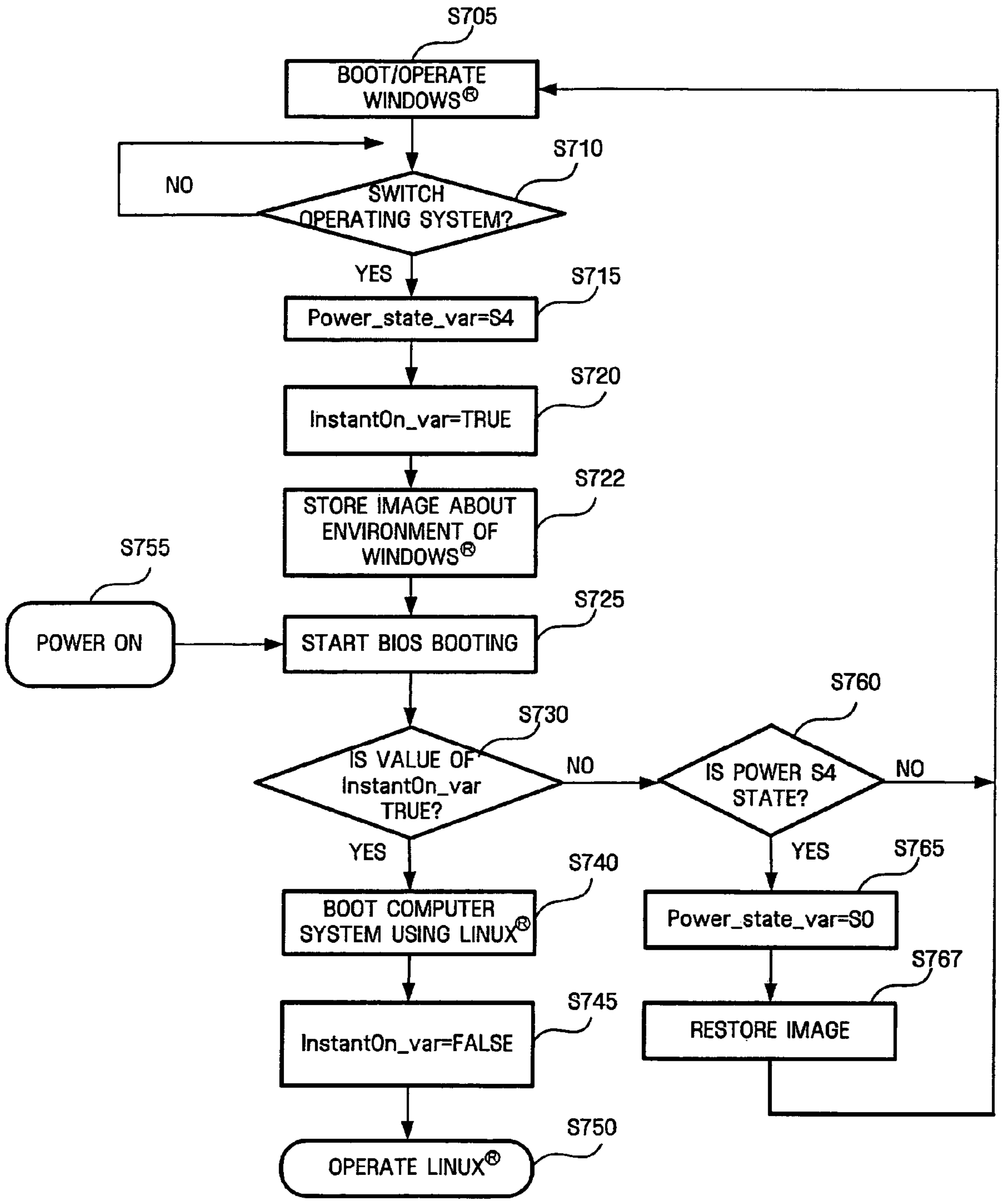
FIG. 7 is a flowchart illustrating an operating system switching method shown in FIG. 6.

FIG. 7 is a flowchart illustrating an exemplary operating system switching method shown in FIG. 6.

For example, it is assumed that the current Windows® operating system is normally booted and operates in step S705. In this example, when an event indicating that the user switches the operating system occurs, a value indicating an S4 power management state of the ACPI specification is set in a variable 'Power_state_var' in steps S710 and S715. Then, a variable 'InstantOn_var' is set to 'TRUE' in step S720.

Then, information on an environment of the Windows® operating system is imaged and stored in step S722, and bios booting starts in step S725.

Meanwhile, a case where the variable 'InstantOn_var' is set to 'TRUE' indicates that the current operating system is switched to an operating system that has not operated at present, and a case where the variable 'InstantOn_var' is set to 'FALSE' indicates that the current operating system is not switched to the operating system that has not operated at present, that is, that the operating system that is currently running is maintained. Preferably, an initial value of the variable 'InstantOn_var' is set to 'FALSE', and the variable 'Power_state_var' and the variable 'InstantOn_var' is stored in a bios ROM.

When bios booting starts in step S725, the computer system is booted by the Linux® operating system in step S740, and the variable 'InstantOn_var' is set to 'FALSE'. This is because, if the variable 'InstantOn_var' is set to 'TRUE', the operating system may be switched to the Windows® operating system. Then, the Linux® operating system operates in step S750.

Meanwhile, the computer system may operate by pressing a power button of the computer system that is turned off in step S755. In this case, bios booting starts like in a conventional method in step S725. In this case, it is assumed that the booted operating system is initially set to the Windows® operating system. Thus, since the variable 'InstantOn_var' is set to 'FALSE', the current operating system is not switched to the Linux® operating system.

When the variable 'Power_state_var' is set to a value indicating a state which corresponds to the S4 power management state of the ACPI specification (step S760), the variable 'Power_state_var' should be set to a value which corresponds to the S0 power management state of the ACPI specification in step S765. This is because the computer system is prevented from remaining in the S4 power management state of the ACPI specification. Then, the image stored in step S722 is restored in step S767.

Meanwhile, it is assumed that the Linux® operating system is used for a specific purpose, for example, for a purpose of seeing a movie, listening to music, or viewing photos or pictures using a variety of image files. In this case, if various processes or hardware not used for the above purpose are permitted to operate continuously, unnecessary consumption of system resources or power is resulted. Thus, when the Windows® operating system is switched to the Linux® operating system, a procedure for allowing only the processes or hardware needed for the above purpose to operate (hereinafter, referred to as a 'low-power state mode') is required.

Figure 8:
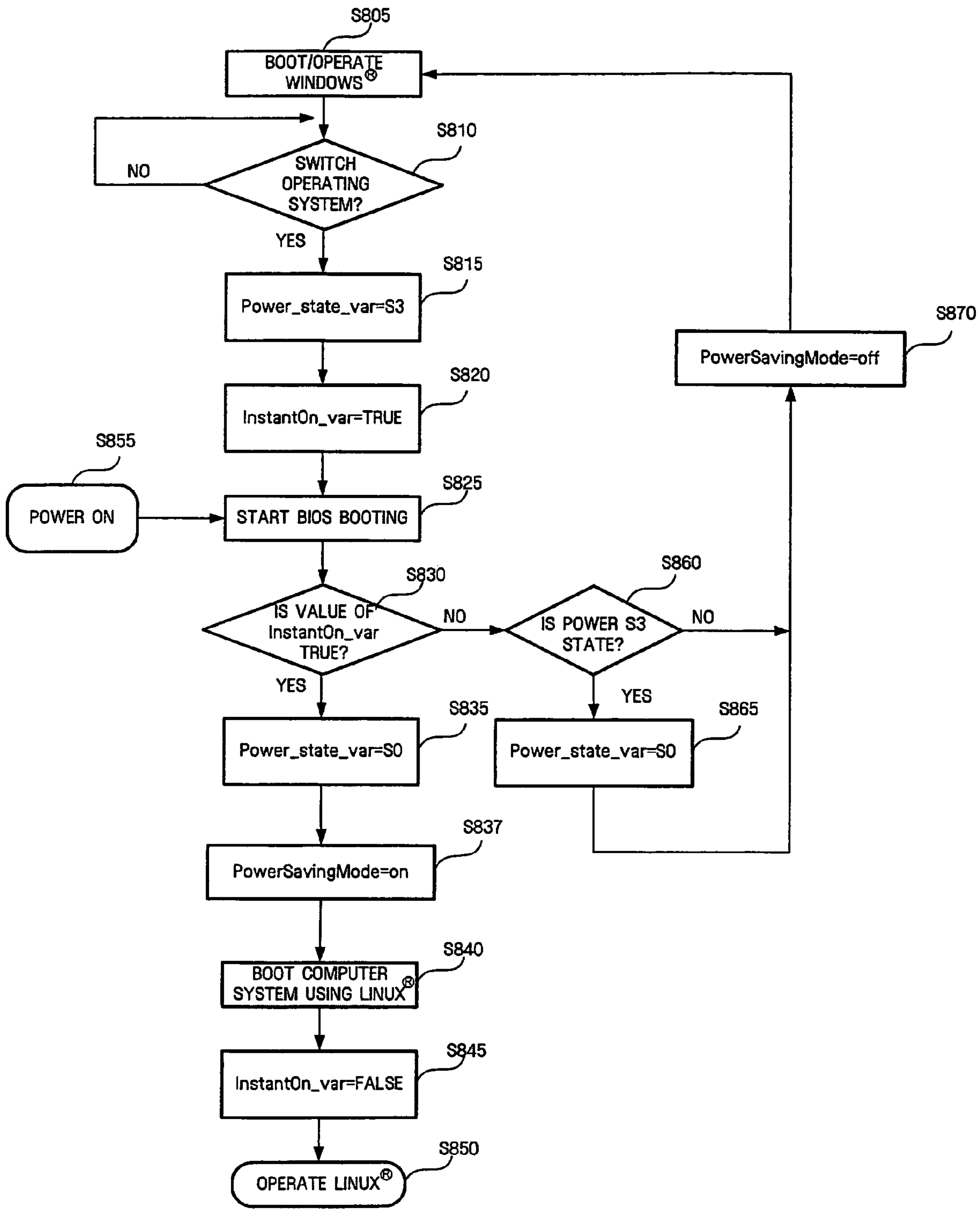
FIG. 8 is a flowchart illustrating an operating system switching method according to another exemplary embodiment of the present invention.

FIG. 8 is a flowchart illustrating an operating system switching method according to another exemplary embodiment of the present invention, that is, an operation of setting a lower-power state mode during operating system switching shown in FIG. 5. Steps S805 through S835 of FIG. 8 generally correspond to steps S505 through S535 of FIG. 5. Steps S840 through S865 of FIG. 8 generally correspond to steps S540 through S565 of FIG. 5.

A low-power state mode may be set when the Window operating system is switched to the Linux® operating system. For example, when a variable indicating an active or inactive state of the low-power state mode is 'PowerSavingMode', if a value of the variable is set to 'on' in step S837, when a computer system is booted by the Linux® operating system in step S840, the environment of a system in a low power state is established. However, when the computer system is booted by the Windows® operating system, a value of the variable 'PowerSavingMode' is set to 'off' in step S870 so that the low-power state mode is canceled. Meanwhile, a method of establishing the environment of a system in a low power state when the computer system is booted by the Linux® operating system by setting the value of the variable 'PowerSavingMode' to 'on' will now be described with reference to FIGS. 10 and 11.

Figure 9:
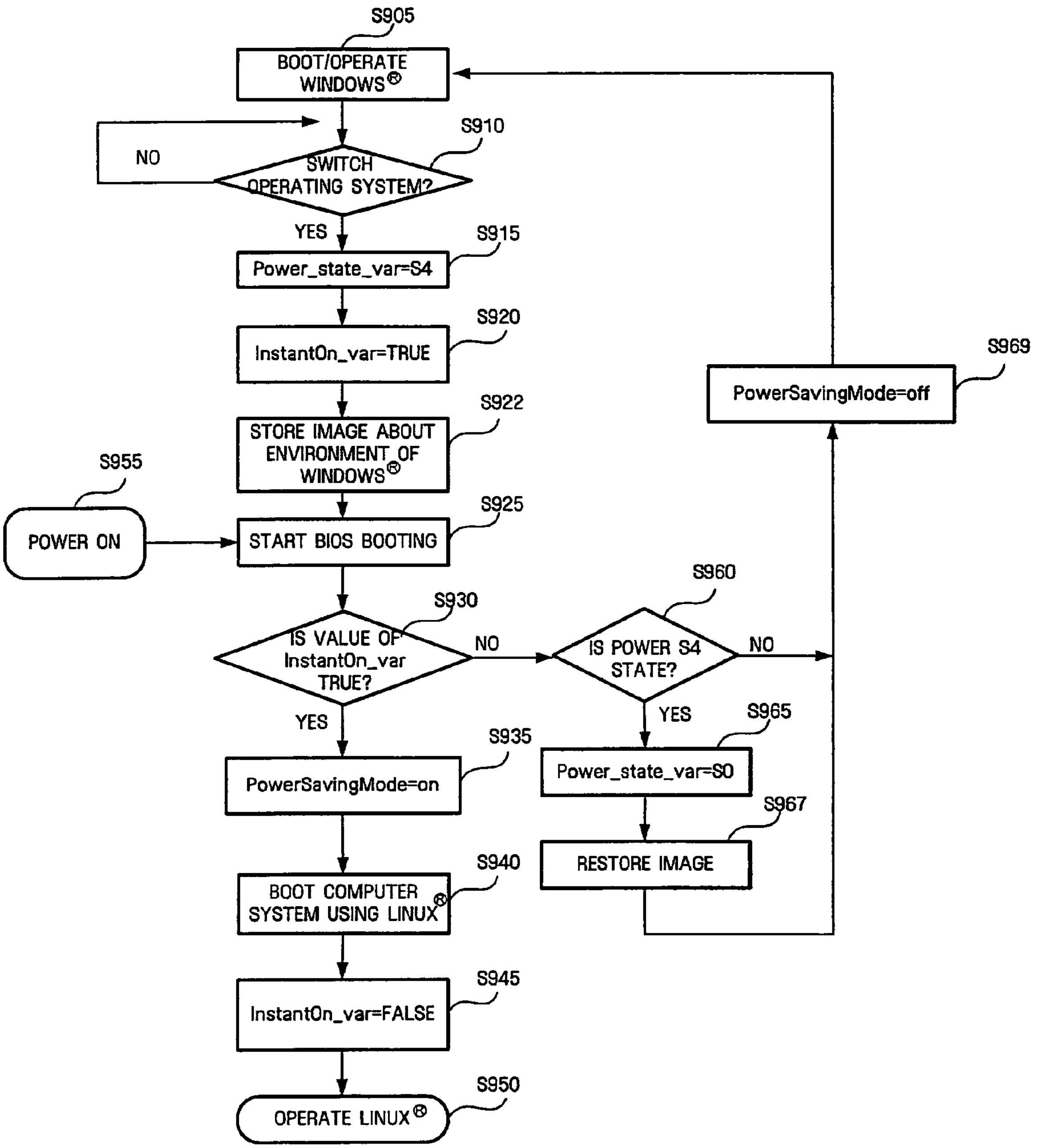
FIG. 9 is a flowchart illustrating an operating system switching method according to another exemplary embodiment of the present invention.

FIG. 9 is a flowchart illustrating an operating system switching method according to another exemplary embodiment of the present invention, that is, an operation of setting a lower-power state mode during operating system switching shown in FIG. 7. Steps S905 through S930 of FIG. 9 generally correspond to steps S705 through S730 of FIG. 7. Steps S940 through S967 of FIG. 9 generally correspond to steps S740 through S767.

A low-power state mode, like in FIG. 8, is set when the Windows® operating system is switched to the Linux® operating system in step S935. When a computer system is booted by the Linux® operating system in step S940, the environment of a system in a low power state is established. However, when the computer system is booted by the Windows® operating system, a value of a variable 'PowerSaving Mode' is set to 'off' in step S969 so that the low-power state mode is canceled.

Figure 10:
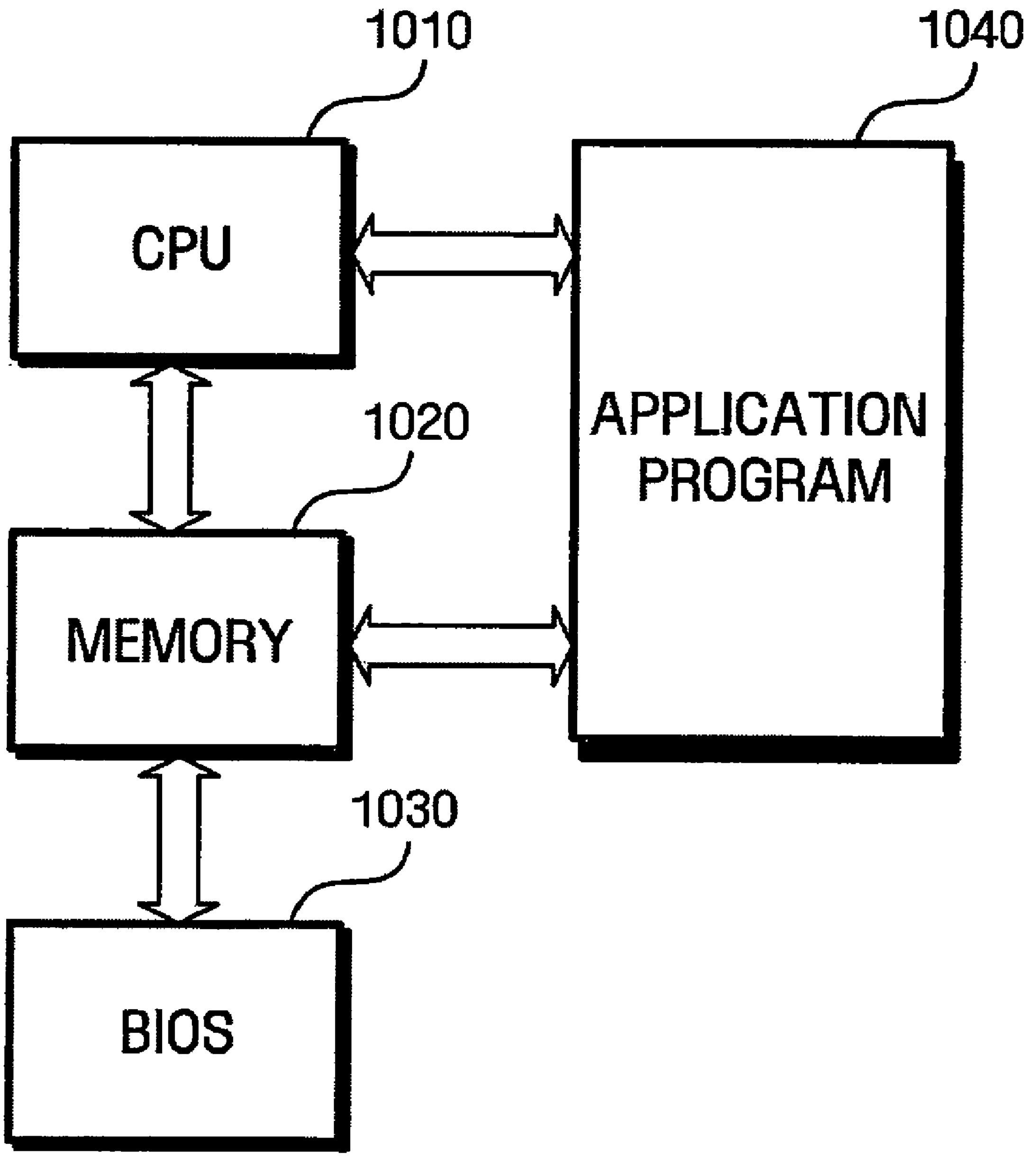
FIG. 10 is a block diagram illustrating a computer system for controlling a low-power state according to another exemplary embodiment of the present invention.

FIG. 10 is a block diagram illustrating a computer system for controlling a low-power state according to another exemplary embodiment of the present invention. A computer system 300 includes a CPU 1010, a memory 1020, a bios 1030, and an application program 1040, which accesses a channel for controlling hardware disposed in the memory 1020 (hereinafter, referred to as an 'application program'). Meanwhile, for a better understanding of the present invention, it is assumed that the Linux® operating system is used to see the movie, listen to the music, or to see photos or pictures using a variety of image files, that is, that the Linux® operating system is used only to provide multimedia contents. However, any other operating system may be substituted for Linux®. Thus, the application program 1040 include programs such as programs for reproducing movies or music or image viewers and operate a corresponding program depending on an object that the user selects.

The operation shown in FIG. 10 will now be specifically described with reference to a flowchart of FIG. 11.

Figure 11:
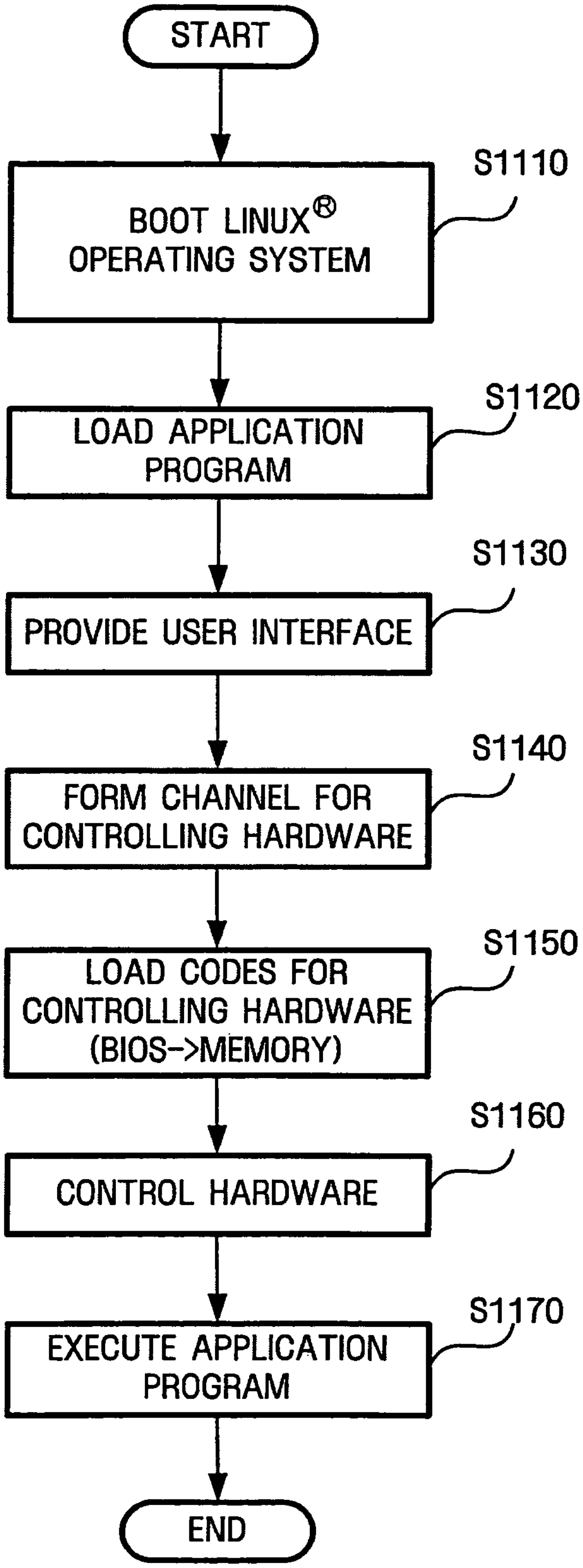
FIG. 11 is a flowchart illustrating a method of controlling a low-power state according to another exemplary embodiment of the present invention.

FIG. 11 is a flowchart illustrating a method of controlling a low-power state according to another exemplary embodiment of the present invention.

When a user switches the Windows® operating system to the Linux® operating system, the Linux® operating system starts booting in step S1110. In this case, a value of a variable 'PowerSavingMode' is set to 'on' so that a low-power state mode is activated. The application program 1040 operates at an upper position of the Linux® operating system. In this case, other applications or processes except for the application program 1040 do not operate in step S1120.

Figure 12:
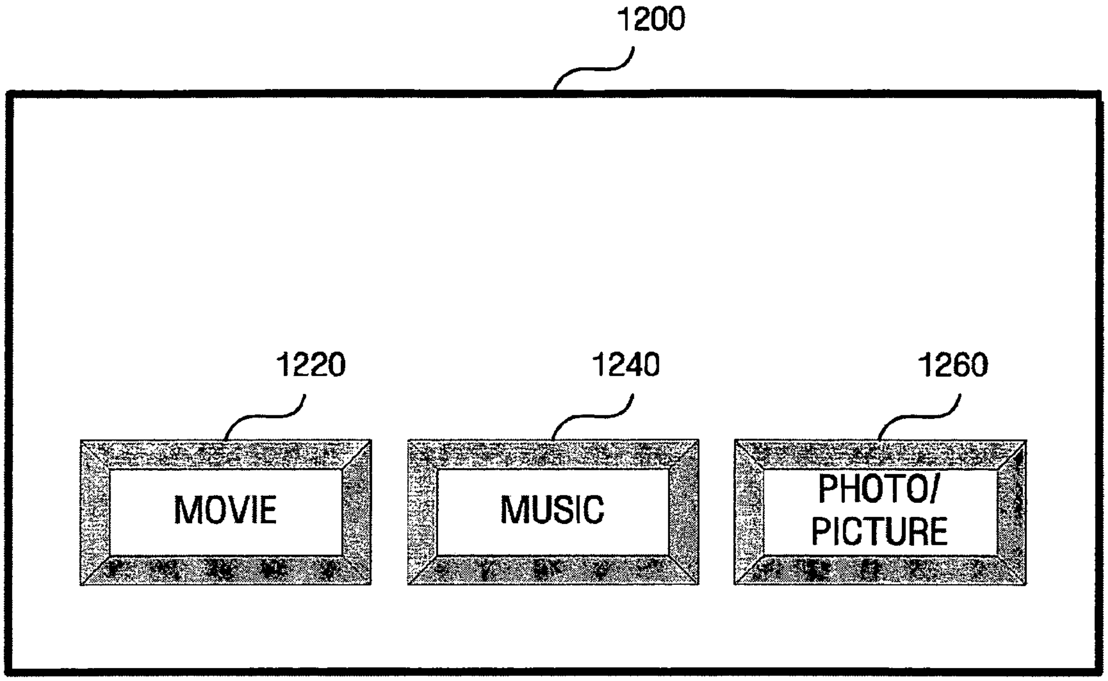
FIG. 12 is an exemplary view illustrating a user interface according to the structure shown in FIG. 10.

Then, the application program 1040 provides a user interface 1200 shown in FIG. 12 to the user so that the user can select one of contents such as a movie 1220, music 1240, and photo/picture 1260 in step S1130. In this case, the shape of the user interface 1200 may be changed according to the design of the application program 1040, and the user can select to execute specific contents in the environment of the Linux® operating system.

If the user wants to see a movie in the environment of the Linux® operating system, the user selects the movie 1220 from the user interface 1200. Then, the application program 1040 starts to establish the environment of a low-power system for playing movies. In other words, the state of hardware installed in the system, such as the CPU 1010, an optical disc drive, a hard disc drive, a liquid crystal display (LCD) panel, and a wireless LAN module etc., is set to an optimum state for playing movies. To this end, a method of controlling the above hardware using the application program 1040 is needed. In an exemplary embodiment, a channel for controlling hardware is formed in the memory 1020 in step S1140. In general, codes for controlling hardware are recorded in the bios 1030. A specific area of the memory 1020 is mapped to the codes and the application program 1040 accesses the specific area so that the codes for controlling hardware recorded in the bios 1030 are loaded into the memory 1020 in step S1150. In this case, interrupt occurs and the CPU 1010 executes codes loaded into the memory 1020 so that the application program 1040 controls hardware in step S1160. For example, when the user wants to see a move stored on an optical disc drive, power supplied to a hard disc drive is cut off, and when the speed of a clock is adjusted so that the CPU 1010 performs 75% of functions and the brightness of the LCD panel is divided into 10 stages (for example, the brightest state is set to stage 10), the brightness of the LCP panel can be set to 7 stages and power can be prevented from being supplied to the wireless LAN module. The information can be preset in the bios 1030, and the degree of controlling each hardware may be different depending on which of the movie 1220, the music 1240 and the photo/picture 1260 the user selects. For example, when the user wants to see the music stored in a hard disc drive, the brightness of the LCD panel can be set to 3 to 4 stages lower than 7 stages, power can be prevented from being supplied to the optical disc drive, and the speed of a clock can be set so that the CPU 1010 performs 50% of functions.

The CPU 1010 executes the codes loaded into the memory 1020 thereby controlling related hardware. Thus, the application program 1040 is in charge of control and executes a movie to enable the user to see the movie stored in the optical disc drive in step S1170.

According to the present invention, when an operating system is switched in a computer system having at least two operating systems, the operating system can be switched more quickly without the need of a user's additional operation. In addition, the environment of a previous operating system can be restored.

While the present invention has been particularly shown and described with reference to a few exemplary embodiments thereof, it would be appreciated by those skilled in the art that various changes in form and details may be made in these exemplary embodiments without departing from the principles and spirit of the invention, the scope of which is defined in the claims and their equivalents.

What is claimed is:

1. An operating system switching method in a computer system having at least two operating systems, the operating system switching method comprising:

receiving a command of switching a first operating system that is currently running to a second operating system;

causing the computer system to make a transition to a different low-power sleeping state in response to the command and according to whether a storing of information on an environment of the first operating system is performed; and booting the computer system using the second operating system, wherein the operating system switching includes storing power management state information and the stored operating system switching information to maintain storage of the stored power management state information and stored operating system switching information in a storage when power to the computer is turned off, and wherein a switching module, implemented with a device that operates by a power source that does not operate the computer system, sets variables indicating the power management state information and the operating system switching information, the values set to the variables being maintained when power to the computer is turned off.

2. The operating system switching method of claim 1, wherein the receiving of the command comprises receiving the command using an inputting unit provided in the computer system.

3. The operating system switching method of claim 2, wherein the inputting unit includes a wireless signal receiving module.

4. The operating system switching method of claim 2, wherein the inputting unit includes a network interface module.

5. The operating system switching method of claim 1, wherein the causing of the computer system to make a transition to a low-power sleeping state comprises storing information on an environment of the first operating system when receiving the command in a predetermined storage area.

6. The operating system switching method of claim 5, wherein the information includes system resource information, program information, or data information.

7. The operating system switching method of claim 5, wherein the information is stored in the predetermined storage area in an S4 power management state according to the ACPI specification.

8. The operating system switching method of claim 1, wherein the booting of the computer system using the second operating system comprises extracting information on the environment of the operating system from the predetermined storage area and providing an environment of the second operating system using the extracted information, the extracted information including information on the environment of the second operating system that operates before switching the second operating system to the first operating system.

9. The operating system switching method of claim 8, wherein the information is stored in the predetermined storage area in an S4 power management state according to the ACPI specification.

10. The operating system switching method of claim 1, wherein the inputting unit includes a user inputting device for switching an operating system.

11. The operating system switching method of claim 1, wherein the low-power sleeping state includes an S3 power management state according to the advance configuration and power interface (ACPI) specification.

12. The operating system switching method of claim 1, wherein:

the causing of the computer system to make a transition to a low-power sleeping state comprises setting power management state information indicating the transitioned low-power sleeping state and operating system switching information indicating booting of the computer system using the second operating system; and the booting of the computer system using the second operating system comprises booting the computer system using the second operating system according to the operating system switching information in the power state corresponding to the power management state information.

13. A computer system having at least two operating systems, the computer system comprising:

a receiving module receiving a command of switching a first operating system that is currently running to a second operating system;

a state controlling module causing the computer system to make a transition to a different low-power sleeping state in response to the command and according to whether a storing of information on an environment of the first operating system is performed; and an operating system switching module booting the computer system using the second operating system implemented with a device that operates by a power source that does not operate the computer system, the operating system switching module performs operating system switching by setting variables indicating power management state information and operating system switching information and stores the power management state information and the operating system switching information in a storage, the values set to the variables being maintained when power to the computer is turned off.

14. The computer system of claim 13, wherein the storage stores information on the environment of the second operating system, in which the computer system was being operated before being switched to the first operating system, wherein the operating system switching module extracts the information from the storage and performs operating system switching using the extracted information for providing the environment of the second operating system.

15. The computer system of claim 14, wherein the storage module stores the information in an S4 power management state according to the ACPI specification.

16. The computer system of claim 13, wherein the low-power sleeping state includes an S3 power management state according to the advance configuration and power interface (ACPI) specification.

17. The computer system of claim 13, wherein:

the state controlling module transmits power management state information indicating the transitioned low-power sleeping state and operating system operating system switching information indicating booting of the computer system using the second operating system to the operating system switching module; and the operating system switching module boots the computer system using the second operating system according to the operating system switching information in the power state corresponding to the power management state information.

* * * * *

UNITED STATES PATENT AND TRADEMARK OFFICE

CERTIFICATE OF CORRECTION

PATENT NO. : 7,886,136 B2
APPLICATION NO. : 11/131316
DATED : February 8, 2011
INVENTOR(S) : Sung-min Yoon It is certified that error appears in the above-identified patent and that said Letters Patent is hereby corrected as shown below:

Column 16, Line 12 (Approx.), In Claim 17, after "and operating system" delete "operating system". (Repeated Occurrence).

Signed and Sealed this
Twenty-sixth Day of April, 2011

David J. Kappos

*Director of the United States Patent and Trademark Office*